United States Patent [19]

Carpenter et al.

[11] Patent Number: 4,824,040
[45] Date of Patent: Apr. 25, 1989

[54] QUICK BAIL OPENING SYSTEM FOR FISHING REEL

[75] Inventors: Robert L. Carpenter; Steven L. Swisher, both of Tulsa, Okla.

[73] Assignee: Zebco Corporation, Tulsa, Okla.

[21] Appl. No.: 36,978

[22] Filed: Jun. 1, 1987

Related U.S. Application Data

[60] Division of Ser. No. 820,579, Jan. 16, 1986, Pat. No. 4,676,450, which is a continuation of Ser. No. 568,746, Jan. 6, 1984, abandoned.

[51] Int. Cl.⁴ ............................................. A01K 89/01
[52] U.S. Cl. .................................................. 242/84.2 G
[58] Field of Search .................. 242/84.2 G, 84.2 F, 242/84.21 R, 84.21 A

[56] References Cited

U.S. PATENT DOCUMENTS 4,196,868  4/1980  Puryear et al. ............... 242/84.2 G
4,279,387  7/1981  Morimoto ..................... 242/84.2 G

FOREIGN PATENT DOCUMENTS 45-24539  9/1970  Japan ............................. 242/84.2 F
53-32191  3/1978  Japan ............................. 242/84.2 G Primary Examiner—John M. Jillions
Attorney, Agent, or Firm—Wood, Dalton, Phillips, Mason & Rowe

[57] ABSTRACT

A spinning reel is disclosed and has a housing with a center shaft upon which a spool is mounted for holding a fishing line. A handle and gear train assembly are provided for rotatably driving a rotor which is coaxially mounted on the shaft. The rotor has bail ears upon which bail arms carrying a bail are mounted with the bail being movable between a closed retrieving position and an open casting position. A unique bail actuating mechanism is provided which rapidly moves the bail from the retrieving position to the casting position. The bail actuating mechanism has an overcenter spring apparatus which operates on one bail arm for holding the bail in the line retrieving position and, when manually moved beyond a certain point, drives the bail rapidly to the open casting position.

7 Claims, 6 Drawing Sheets

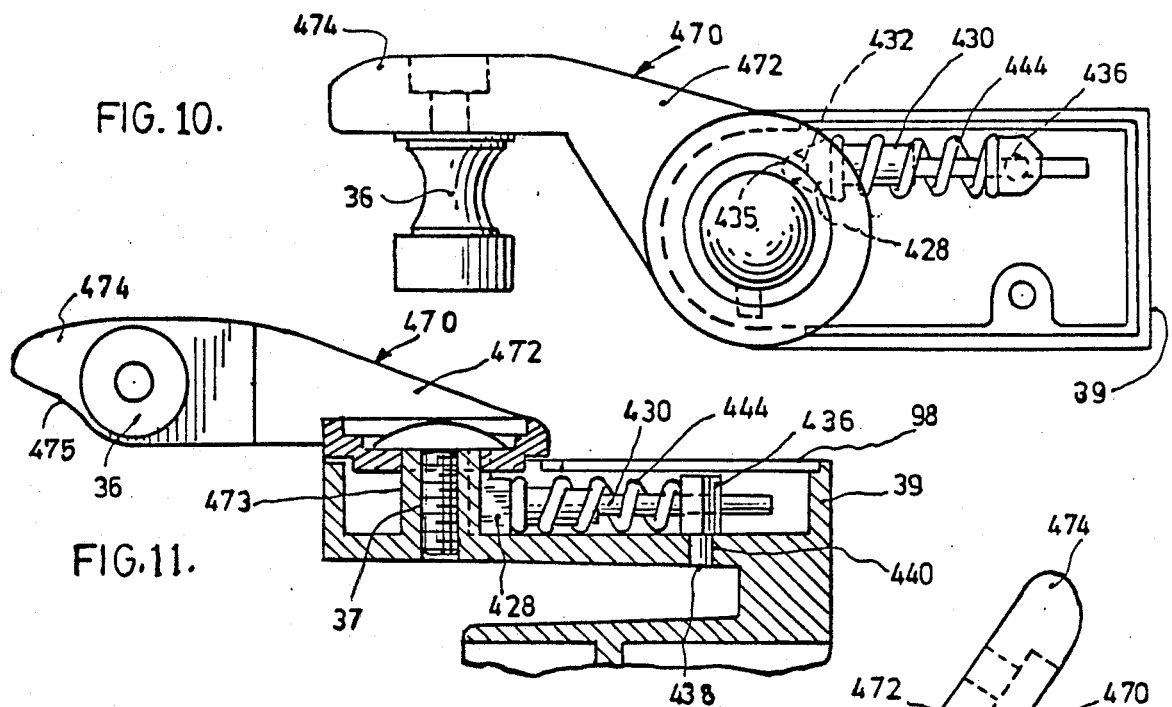

QUICK BAIL OPENING SYSTEM FOR FISHING REEL

This is a division of application Ser. No. 820,579 filed Jan. 16, 1986, now U.S. Pat. No. 4,676,450 which is a continuation of application Ser. No. 568,746, filed Jan. 6, 1984 now abandoned.

BACKGROUND OF THE INVENTION

1. Field of the Invention

This invention relates to a spinning style fishing reel, and more particularly, relates to an apparatus for rapidly moving a bail from a line retrieving position to a line casting position.

2. Background of the Prior Art

It is well known in the prior art that in spinning style fishing reels the bail must be moved by hand from the retrieve position to the cast position. This is true even in the highly successful current models of spinning reels having a self centering and anti-reverse mechanism such as shown and described in U.S. Pat. No. 4,208,020 invented by Richard L. Gifford and assigned to the common assignee of the present application. However, in such a spinning reel when the fisherman wants to cast the line he must use the hand that he normally uses to crank in the line to pivot the bail to the cast position. Releasing the crank to pivot the bail loses some control of the line and increases the time in getting off the next cast.

Recently, some attempts have been made to solve the problem by providing a pivoted finger grip on the rotor with a lever engaging off-center on the bail arm for leveraging the bail arm and bail from the retrieve to the cast position. The apparatus required relocating the orientation of the self-centering cast position of the rotor out of alignment with the mounting stem of the reel in order to get the clearance needed to pivot the bail fully open and to avoid interference between the finger grip lever and the stem. This system is convenient for a right-handed user but is very awkward for lefthanders. The finger grip and its mounting is relatively massive causing unbalance in the rotor. The finger grip is pivoted parallel to a tangent to the rotor and from one side only (somewhat cantilevered) which leads to breakage of the finger grip and, on occasion, binding of the finger grip. A torsion spring is used to provide the biasing force, which torsion spring is subject to frequent failure.

Another system on the market provides a pivoted finger grip for actuating the bail, which finger is pivoted about an axis generally radially of the rotor. The pivot is short and due to the angle of applied force when used, is subject to breakage. The system also necessitates relocating the self-centering cast position of the rotor offset from the axis of the stem with the same problem as described above, namely, it is fine for righthanders but unsuitable for lefthanders. Also torsion springs are used which are subject to frequent failure.

A still third current device uses a massive finger grip pivoted on the rotor about an axis parallel to a tangent to the rotor. The finger grip engages a cam pivoted on the bail ear and connected to the bail arm through a link connection for pivoting the bail arm and bail. A link connection and the use of a torsion spring both result in a device that has been less than satisfactory on the market. The massiveness of the device contributes to an unbalance of the rotor. The pivoting of the finger grip is from one side only (cantilevered) which can cause the finger grip to break off as well as to bind.

SUMMARY OF THE INVENTION

This invention relates to spinning reels and to a mechanism that rapidly and reliably pivots a bail from the retrieve position to the cast position without the problems of the prior art identified hereinabove.

The invention contemplates a very simple and smoothly operating device having an overcenter compression spring arrangement which provides a positive, long lasting actuating force that is economical to manufacture and is trouble free in use. The overcenter spring arrangement can be used effectively with different types of actuators. Eliminating the torsion spring has extended the life cycle of the quick cast reel many fold. In one form the actuating trigger is pivoted at spaced points which prevents breakage, eliminates canting of the trigger and guides the actuator without failure. The trigger pivot is forward or axial of the rotor which results in a short stroke with excellent leverage and is easier to grasp and facilitates the finger sliding off the trigger after the bail is in the cast position.

It is therefore an object of this invention to provide a spinning style fishing reel with a mechanism that is conveniently located on the reel for easy engagement for rapid arming of a reel ready for casting.

It is another object of the invention to provide a bail actuating mechanism that moves the bail from the retrieve position to the cast position with a simple flick of a finger.

Another object of the invention is to provide a mechanism that can provide a bail control that can be opened or closed with a simple flick of the finger.

A further object of the invention is a device that is compatible with many currently manufactured reels and can be adapted thereto without major modifications or redesign.

A still further object of the invention is the use of an overcenter spring arrangement for positively moving the bail from the retrieve position to the cast position.

Yet another object of the invention is the location of the quick opening mechanism such that it can be conveniently used by both lefthanded and righthanded fishermen.

Another object of the invention is the elimination of the fragile links and pivots associated therewith which contribute to binding and hang-ups of the presently available apparatus.

It will be clear that the quick opening mechanism with its inherent advantages could be utilized employing overcenter springs or devices other than the preferred overcenter spring means of this invention. The invention in any of the forms, whether the preferred or alternative, is applicable to reels with either the rear mounted drag as shown or front mounted drag (not shown).

The above and other and further objects and features will be more readily understood by reference to the following detailed description and the accompanying drawings.

DESCRIPTION OF THE DRAWINGS

FIG. 10 is a top plan view of the modified form of the invention shown in FIGS. 2 and 9 with the remainder of the reel not shown;

FIG. 11 is an elevational sectional view of the modified form of invention shown in FIG. 10 with the remainder of the reel not shown; and FIG. 12 is a top plan view of the modified form of the invention shown in FIG. 10 only with the bail in the casting position with the remainder of the reel not shown.

DESCRIPTION OF BASIC STRUCTURE AND OPERATION OF FISHING REEL

Figure 1:
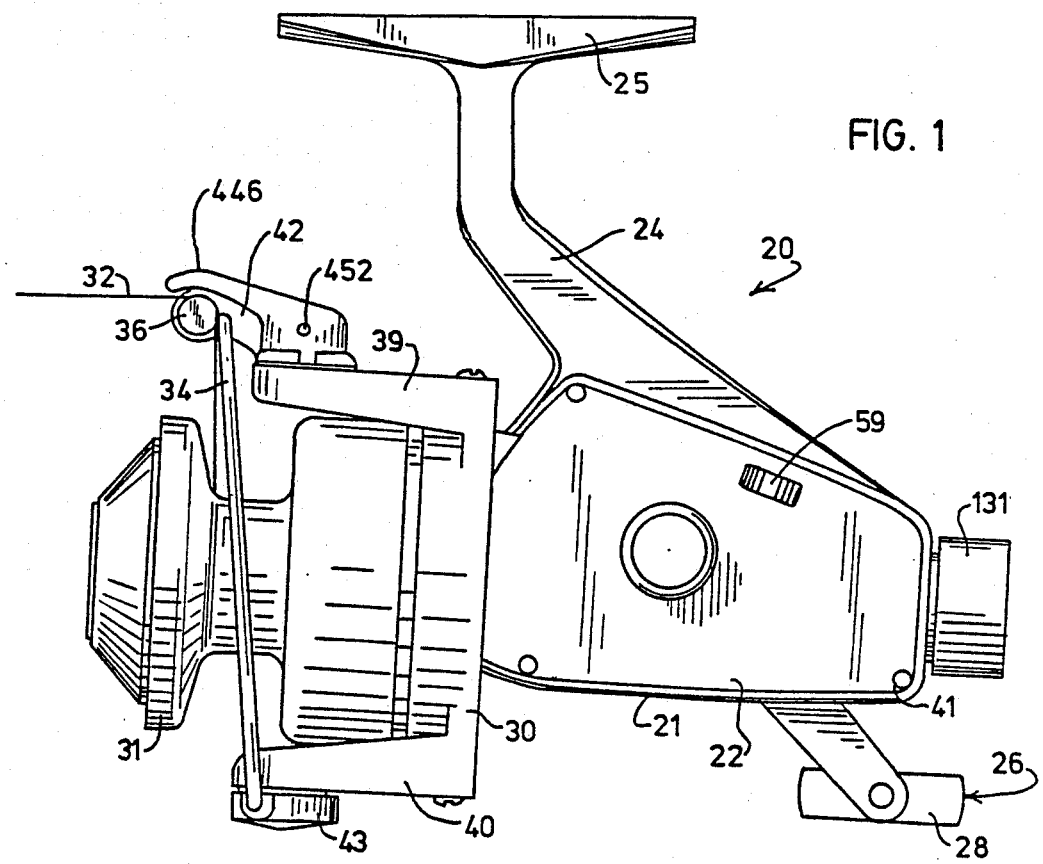
FIG. 1 is an elevation view of a skirted style spinning reel containing one preferred form of the invention described herein.

A spinning reel 20 (FIGS. 1 and 3) or 20a (FIG. 2) has a housing 21 which includes an integral gear case 23 (FIG. 3) over the opening of which is secured a cover 22 as by screws 41. The housing has a stem 24 which connects the housing to a shoe 25. The shoe 25 is used to attach the reel to a fishing rod. The reel includes a crank assembly 26, mounted on the housing 21 and rotatable about a crank shaft hub 27 with a rotatable winding handle 28 for use by a fisherman with his right hand for line retrieval, while the rod (not shown) is being held by the left hand. As is well known in the art, the handle 28 may be disposed on the other side of the housing 21 for accommodating the personal desires of the user.

Figure 3:
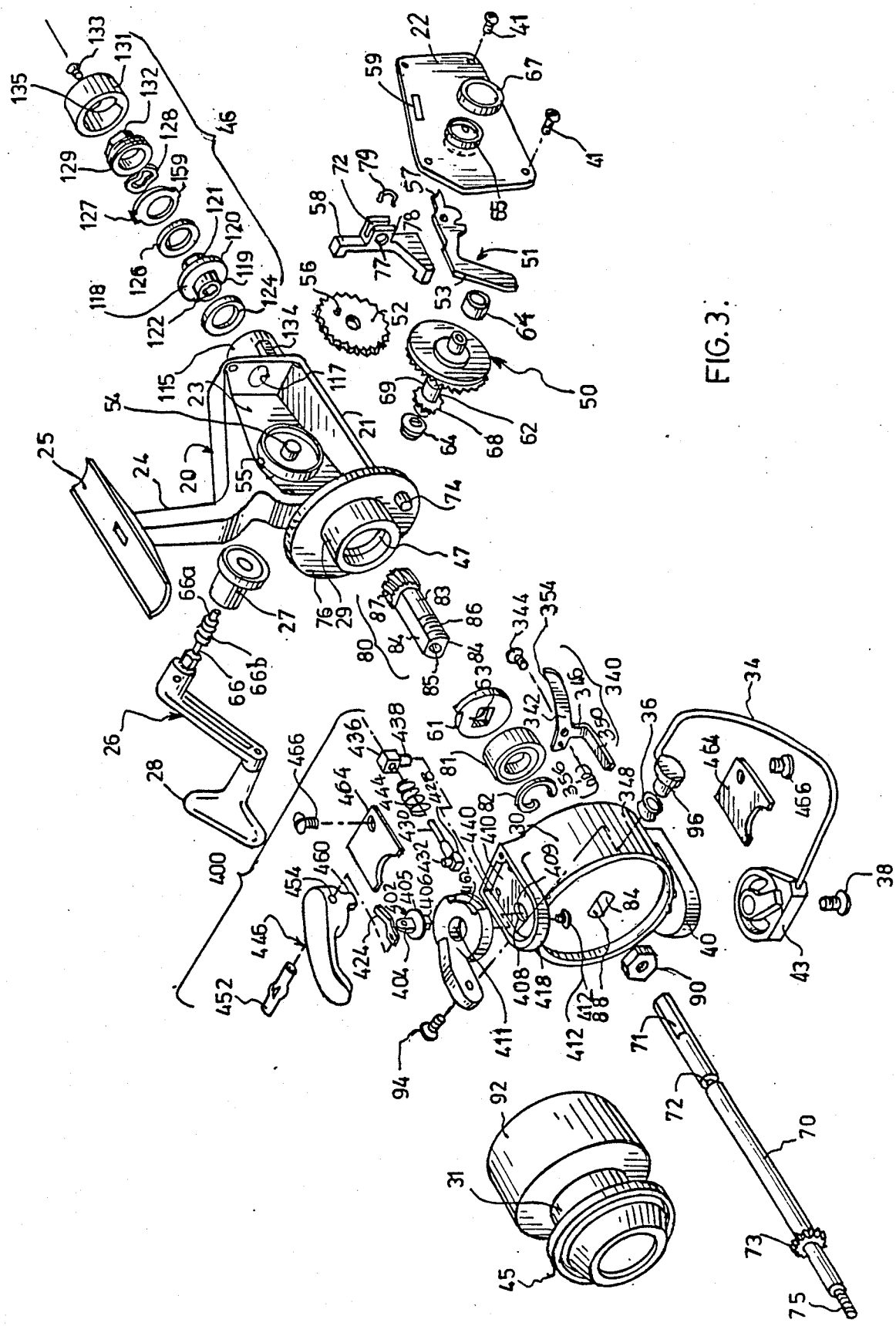
FIG. 3 is an exploded perspective view of the skirted style spinning reel of FIg. 1 including the invention described herein.
Figure 4:
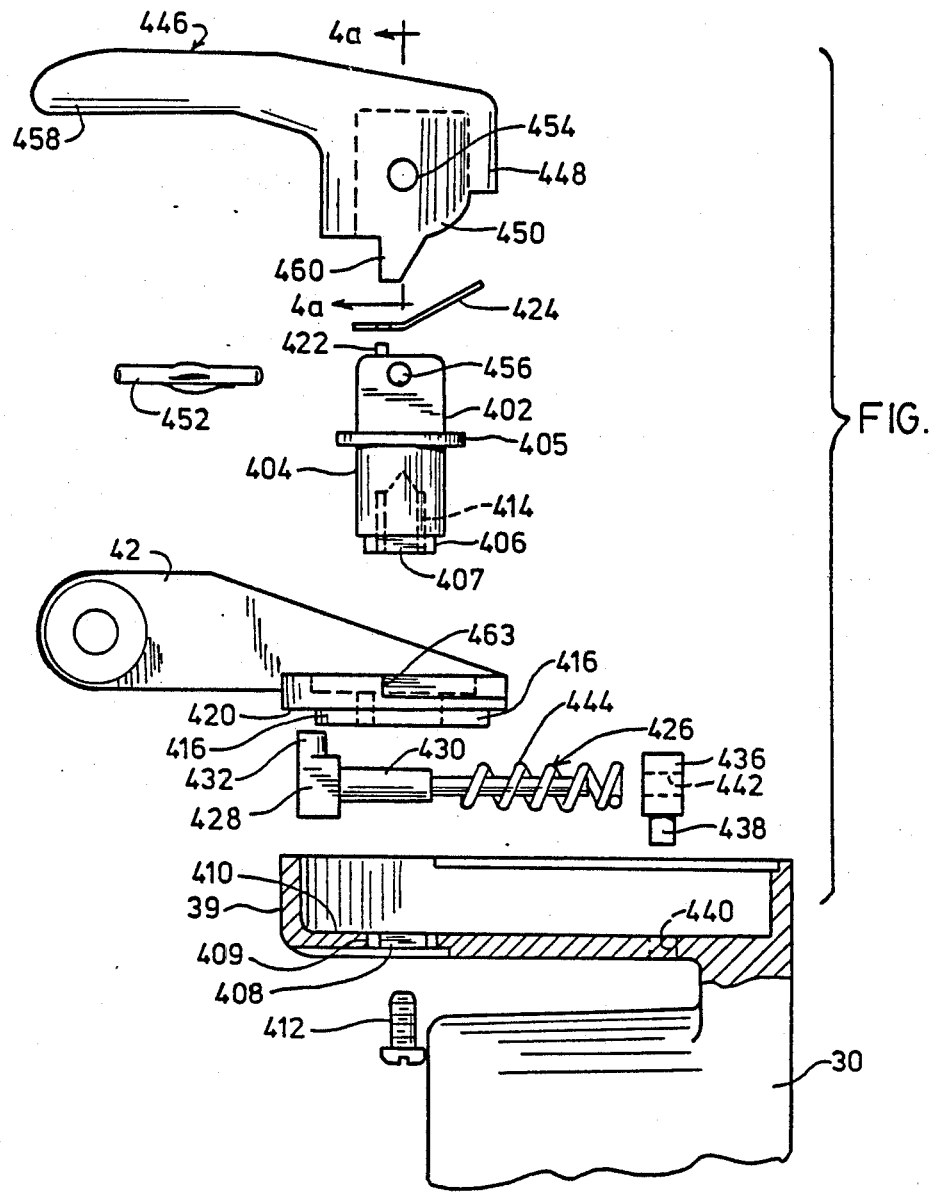
FIG. 4 is an exploded elevational view of the details of the one preferred form of the invention shown in FIG. 1.
Figure 4A:
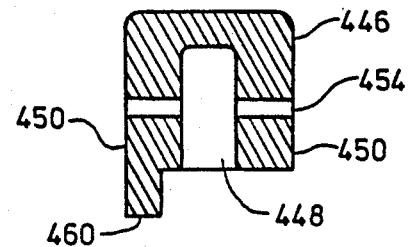
FIG. 4(a) is a cross-sectional view taken along the line 4a—4a of FIG. 4.

Referring to FIG. 3 in particular, an axially mounted rotor 30 is provided and is adapted to be rotated about the axis of a spool 31 as the crank 28 is turned for line retrieval, with a fishing line 32 being captured by a bail 34 passing over a line guide 36 as shown. Bail 34 and line guide 36 are mounted on bail axle arm 42 and bail hinge arm 43 which arms 42,43 in turn are pivoted on bail ears 39 and 40. The bail ears 39,40 are integral with the rotor 30 and rotate with rotor 30 whereupon the line 32 is wound on the spool 31.

Figure 2:
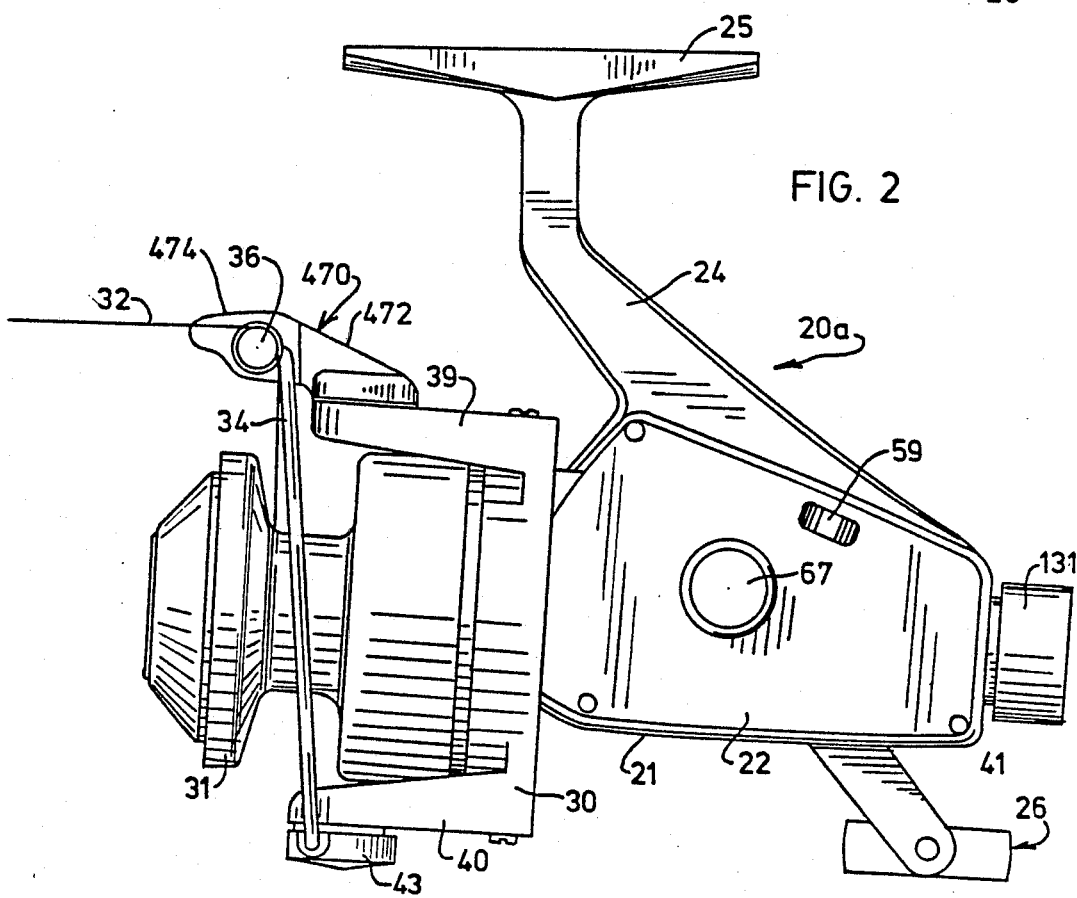
FIG. 2 is an elevation view of a skirted style spinning reel containing another preferred form of the invention described herein.

A screw 38 passes through bail arm 43 and is threaded in the bail ear 40 and acts as the pivot for the bail arm 43. A bail arm post 402 which will be described in detail hereinafter and which is a part of the improved structure constituting a portion of the present invention, is secured to the bail ear 39 and provides the pivot for the other bail arm 42. The bail 34 which is connected to the bail arms 42,43 pivots with bail arms 42,43 about the axis of the screw 38 and bail arm post 402 between an open casting position and a closed retrieving position. An internal mechanism causes the line spool 31 to reciprocate axially back and forth as the rotor 30 rotates winding the line 32 about the spool 31; but as in spinning reels generally, the spool 31 does not rotate about its central core axis, except as controllably permitted by the adjustable rear drag mechanism 46. Such permitted rotation of the spool may occur during line retrieval when an object on the terminal end of the line 32 exerts a force exceeding the friction setting of the drag, causing slippage and thereby preventing breaking the line 32. When the bail 34 is swung from the closed retrieve position to an open position for casting, the line 32 may freely pay out from the spool 31 over lip 45. In FIGS. 1 and 2, the bail 34 is shown in the "closed", "retrieve", or "rewind" position. The line guide roller 36 is preferably rotatable, that is, it is preferably a miniature pulley to reduce the sliding friction which might otherwise cause line wear.

The internal bail trip mechanism 340 can be any of the well known types on the market, but as illustrated, includes a bail trip lever 342 pivoted by screw 344 to the inside of the rotor 30 with a leg 346 passing through a slot (not shown) in the cylindrical wall 348 of the rotor which leg has a lever portion 350 disposed in the bail ear 40 in alignment with abutment 352 in the bail arm 43. The bail trip lever 342 has a cam portion 354 which when the lever 342 is pivoted in one direction, the cam moves from a positio wherein the end of the cam 354 is in close proximity to the shaft 70, which is the bail open or cast position, to a second position wherein the cam 354 is along the inner surface of the cylindrical wall of the rotor, which is the bail closed or retrieve position. A torsion spring 356 is provided for holding the cam portion 354 of the trip lever 342 in close proximity to the inner surface of the cylindrical wall of the rotor so that it will not flop around freely as the rotor is rotated. A cam lug 74 is fixed on flange 76 on the reel housing and is positioned in the rear of the rotor 30 when the rotor is assembled with the reel housing. The cam lug 74 is located radially inward of the trip lever such that when the bail 34 is moved into the cast position the trip lever 342 is pivoted by the abutment 352 in the bail arm 43 so as to place the path of the cam portion 354 such that interference with lug 74 prevents reverse rotation of the rotor 30. Forward rotation of the rotor 30 by the crank 28 sweeps the cam portion of the trip lever 342 against the cam lug 74 which pivots the trip lever 342 causing lever 350 to apply sufficient force against abutment 352 to close the bail for line retrieval.

The bail 34 may be manually closed by using the same forefinger used to open the bail 34 by urging the bail arm 42 forward past the overcenter position.

In the overall arrangement of the reel the cover plate 22 is secured to the gear case 23 by screws 41. Inside the gear case 23 is a gear assembly 50 that is rotatable by rotating the handle 28 about the hub 27. The gear assembly 50, which includes the crank gear 69 and the oscillator pinion gear 68, which are integral with tubular shaft 62, and includes an oscillator gear 52 which is rotatably mounted on stub shaft 54, which may be part of the interior of the gear case 23 or secured separately thereto. Gear 52 has a projecting lug 56 that fits into a groove (not shown) in oscillator slider 58. Rotation of the oscillator gear 52 causes the slider 58 to slide forward and backward. Crank shaft gear assembly 50 has a tubular shaft 62 that is journal mounted in bearings 64 in bores (not shown) in gear case 23 and in a flange 65 on the inside of the cover plate 22. The shaft 62 has an internal right hand thread that mates with a right hand thread 66a of shaft 66 on the crank assembly 26 on one side and a left hand thread that mates with left hand thread 66b when the shaft is placed on the opposite side of the reel. This dual threaded system enables the handle 28 on the reel to be cranked either with the right hand or with the left hand, depending on the side on which handle 28 is mounted. The open end of the shaft 62 (the end in which the shaft 66 is not inserted) is closed off by inserting screw cap 67 on the end of the shaft either exterior of the cover 22 or exterior of the closed side of the gear case 23.

A pinion gear assembly 80 is forwardly rotatably journal mounted in bearing 81 that is mounted in the collar 29 on flange 76 of housing 21 and secured therein by bearing retainer 82 which fits into groove 47 in the collar 29. The assembly 80 has a forward shaft portion 83 with oppositely spaced flats 84 thereon, a central bore 85, a forward threaded portion 86 and a pinion gear 87 on the opposite end portion. A larger gear 69 on shaft 62 engages pinion gear 87 causing the pinion gear assembly 80 to rotate when the crank handle is rotated.

A center shaft 70 has a back or rear splined portion 71, undercut groove 72, an intermediate flange or stop 73, and a front threaded portion 75. The shaft 70 slip fits through the central bore 85 in shaft 83 and extends into the gear case 23. The shaft 70 also fits through the aligned holes 77 in parallel plates 78 in oscillator slider 58. Special clip 79 fits between the plates 78 and snaps into groove 72 in shaft 70 locking the shaft 70 to the slider 58. Thus, when the slider 58 oscillates back and forth the shaft 70 also moves back and forth with respect to the forward flange 76 of the housing 20.

The rotor 30 is mounted on the forward threaded portion 86 of assembly 80. The hole 88 in rotor 30 receives the shaft 83 with the flats 84 mating with the flats 89 of the hole 88. The nut 90 is tightened on the threaded portion 86 to secure the assembly 80 to the rotor 30. The spool 31 fits over the end of shaft 70 and is retained against stop 73 in a conventional manner which may include fastening on thread 75 on the shaft 70. Thus, as the handle 28 turns the crank shaft 66, the gear assembly 50 causes the pinion assembly 80 to rotate which in turn causes the rotor 30 to rotate. At the same time rotation of gear 52 by gear 68 on gear assembly 50 causes the slider 58 to reciprocate back and forth, which causes the center shaft 70 to oscillate back and forth so that line 32 can be wound during the retrieve mode in an orderly and uniform fashion on spool 31.

As shown in FIG. 3, a drag boss 115 is provided on the rear of the housing 21 with a bore 117 extending through the rear wall of the housing 21. The center shaft 70 has the splined rear portion 71 extending through the bore 117 and into the boss 115. The rear drag 46 is assembled in the drag boss 115. The inner surface of the boss is the bearing surface which radially supports the drag driver 118. The drag driver 118 is comprised of a driver boss 119, a flange 120 and a pilot boss 121. The driver boss 119 has internal flats or splines 122 which mate with the flats or spline 71 on the center shaft 70. A friction washer 124 is located between the flange 120 and the housing wall drag surface (not shown) with the pilot boss 121 projecting through the drag boss 115 and having the outer end portion of the driver boss extending into the gear case 23. A second friction washer 126 is radially positioned by driver boss 119 on the outer side of the flange 120. A drag stationary washer 127 encircles the driver boss 119 and is restrained from rotating by engagement of its radially opposed lugs 159 in the radially opposed internal keyways (not shown) on the boss 115. A spring washer 128 encircles the driver boss 119 and applies pressure to the friction washers, which pressure is varied by rotation of the threaded adjustment sleeve 129 which mates with internal threads (not shown) on boss 115. A polygon or splined boss 132 on the adjustment screw 129 mates an internal polygon or spline (not shown) on drag knob 131. Attachment of the drag knob 131 to the sleeve 129 is by a drag knob retainer screw 133. Rotation of the drag knob 131 is limited to one turn, to prevent unintentional removal. The limited rotation is provided by a tang 134 on the periphery of the boss 115, which interrupts rotation by interference with a key 135 on the interior of the flange on drag knob 131.

An anti-reverse self-centering structure 51 is provided in the gear case 23 and includes a pawl 53 pivoted on the post 55 in the gear case 23 with an actuating cam 57 on one end of the pawl in engaging alignment with a slide actuator button 59 on the cover plate 22. The pawl 53 selectively engages the one way tooth 61 on the ratchet 63 which ratchet is keyed on the flats 84 on the pinion gear assembly 80. With the button 59 on the cover 22 in the "on" position, the pawl 53 is pivoted into contact with the tooth 61 on ratchet 63 to prevent reverse rotation of the rotor 30 and to self-center the rotor relative to the housing. When the button 59 is in the "off" position the rotor can rotate in either direction. The tooth 61 on the ratchet 63 is oriented such that engagement of the pawl 53 with the tooth aligns the bail ears 39,40 and bail arms 42,43 along an axis parallel with the axis of the stem 24.

DESCRIPTION OF THE PREFERRED EMBODIMENT

Referring to FIGS. 1 and 3-8, an apparatus 400 for rapidly opening the bail 34 for casting is shown and is operatively associated with the bail arm 42. Specifically, a bail arm post 402 has one end portion 404 bounded on one end by an intermediate flange 405 and on its lower end by an extension 406. The end portion 404 extends through opening 411 in the bail arm 42 with flats 407 on the extension mating with flats 408 in the opening 409 in the bottom wall 410 of the bail ear 39. A screw 412 is threaded from below bail ear 39 into a threaded opening 414 (FIG. 4) in the end of the bail arm post 402 with the head of the screw overlapping the bail ear 39 to retain the bail arm post 402 in a fixed orientation on the bail ear 39. The bail arm 42 has a circular offset projection 416 which seats down into a mating semicircular part 418 of bail ear 39 such that the axial shoulder 420 of the bail arm 42 around projection 416 rotatably rides on the upper face of the wall of the bail ear 39 with the flange 405 on bail arm post 402 overlapping the upper surface of the bail arm. A fastening stud 422 on the upper end of the bail arm post 402 engages with a spring member 424 to retain the spring on the post.

Figure 5:
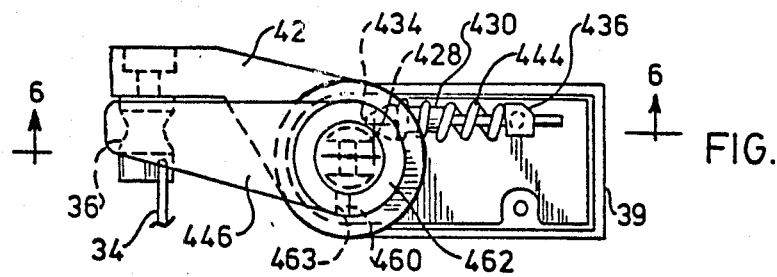
FIG. 5 is a top plan view of the invention shown in FIG. 1 with the bail in the retrieve position with the remainder of the reel not shown.
Figure 6:
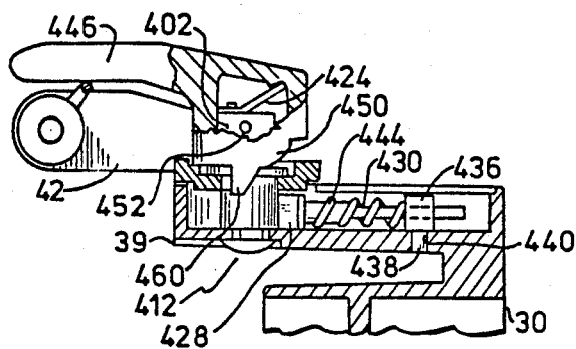
FIG. 6 is an elevational view of the form of invention shown in FIG. 5 with the remainder of the reel not shown.
Figure 6A:
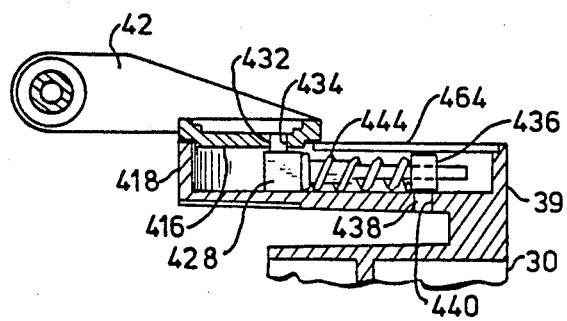
FIG. 6(a) is a sectional view taken along the lines 6—6 of FIG. 5 with the remainder of the reel not shown.
Figure 7:
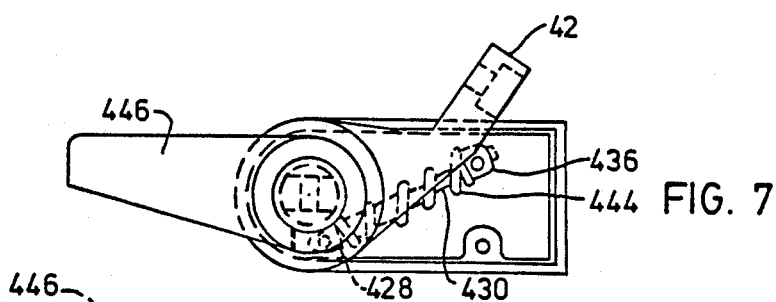
FIG. 7 is a top plan view of the invention shown in FIG. 5 only with the bail in the cast position with the remainder of the reel not shown.
Figure 8:
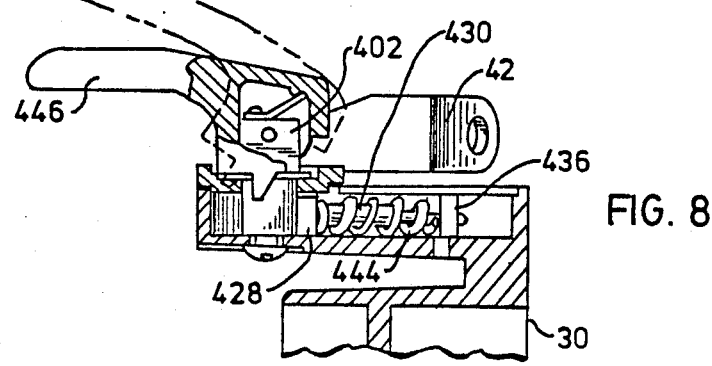
FIG. 8 is an elevational view of the invention shown in FIG. 7 with the trigger in a raised phantom line position which is the position of the trigger for quick opening the bail and in the released solid line position of the trigger.

Between the bail arm 42 and the bail ear 39 is an overcenter apparatus 426 which includes a front pivot post 428 having a guide rod 430 fixed thereon and extending in a direction transverse to a pivot 432. The pivot 432 projects upwardly into pivoting relation in an opening 434 in the undersurface of the bail arm 42. The opening 434, as shown in FIGS. 5 and 6, is formed in the lower surface of the bail arm 42 and is offset radially outwardly from the pivot center of the bail arm 42. A back pivot post 436 has a pivot 438 pivotally projecting into opening 440 in the bottom wall 410 of the bail ear 39 and has a transverse opening 442 extending therethrough in which opening the outer end portion of the guide rod 430 is slidably received. A compression spring 444 encircles the guide rod 430 and exerts a force against the front pivot post 428 and against the bail arm 42 tending to rotate the bail arm 42 counterclockwise about the bail arm post 402 (as viewed in FIG. 5).

A finger trigger 446 has a hollowed body portion 448 which provides spaced legs 450 which straddle the upper end portion of the baiL arm post 402. A pin 452 passes through openings 454 in the legs and through an opening 456 in the bail arm post 402. The spring 424 bears against the under rear surface of the body portion 448 of the trigger to pivot the finger grip portion 458 downward toward the bail arm 42. One leg 450 of the body portion of the trigger has a depending actuating lug 460 which seats in a cut out slot or groove 462 in the bail arm 42. In the retrieve position of the bail arm 42, FIG. 5, the lug 460 bears against an abutment 463 at one end of the groove or slot 462. Cover plates 464 are secured to the bail ears 39,40 by screws 466 which, in the case of bail ear 42, serves to retain pivot post 436 seated in its opening in the bail ear 39. The covers will also keep foreign matter out of the bail ears 39,40.

As is best illustrated in FIGS. 3, 5-8, with the bail 34 in the retrieve position (FIGS. 5, 6), the handle 28 (FIG. 3) is rotated in reverse which will engage the self-centering mechanism to align the bail ears 39,40 and bail arms 42,43 on the rotor in a line parallel with the stem 24. When it is desired to cast the line, the index finger of the hand holding the rod is extended over the grip portion 458 of the trigger 446 which index finger will also pick up the line 32. Upward movement of the end of the trigger will pivot the trigger 446 and lug 460, which lug 460 will pivot the bail arm 42, bail 34 and bail arm 43 about the axis of the post 402 and screw 38 and will further start to compress the spring 444. As the bail arm 42 pivots, the axis of the guide pin 430 will approach a dead center position with the axis of the guide pin intersecting the pivot axis of the bail arm. Once the bail arm 42 is moved to a position whereby the axis of the guide pin 430 is beyond dead center, the compressed force of the spring 444 will drive the bail arms 42,43 and bail to the open, casting position. The trigger 446 will be in the dotted line position of FIG. 8. The finger of the fisherman will slip off the end of the trigger 446, which trigger 446 will return to its down solid line position of FIG. 8. The line 32 will still be over the index finger of the user, which can be used to control the cast.

When the cast has been made, the handle 28 is rotated for line retrieval which will rotate the rotor 30 and engage the lug 74 with the trip lever 342 of the bail trip mechanism 340 to pivot the bail arms 42,43 and bail 34 to the retrieve position ready to reel in the line.

Figure 9:
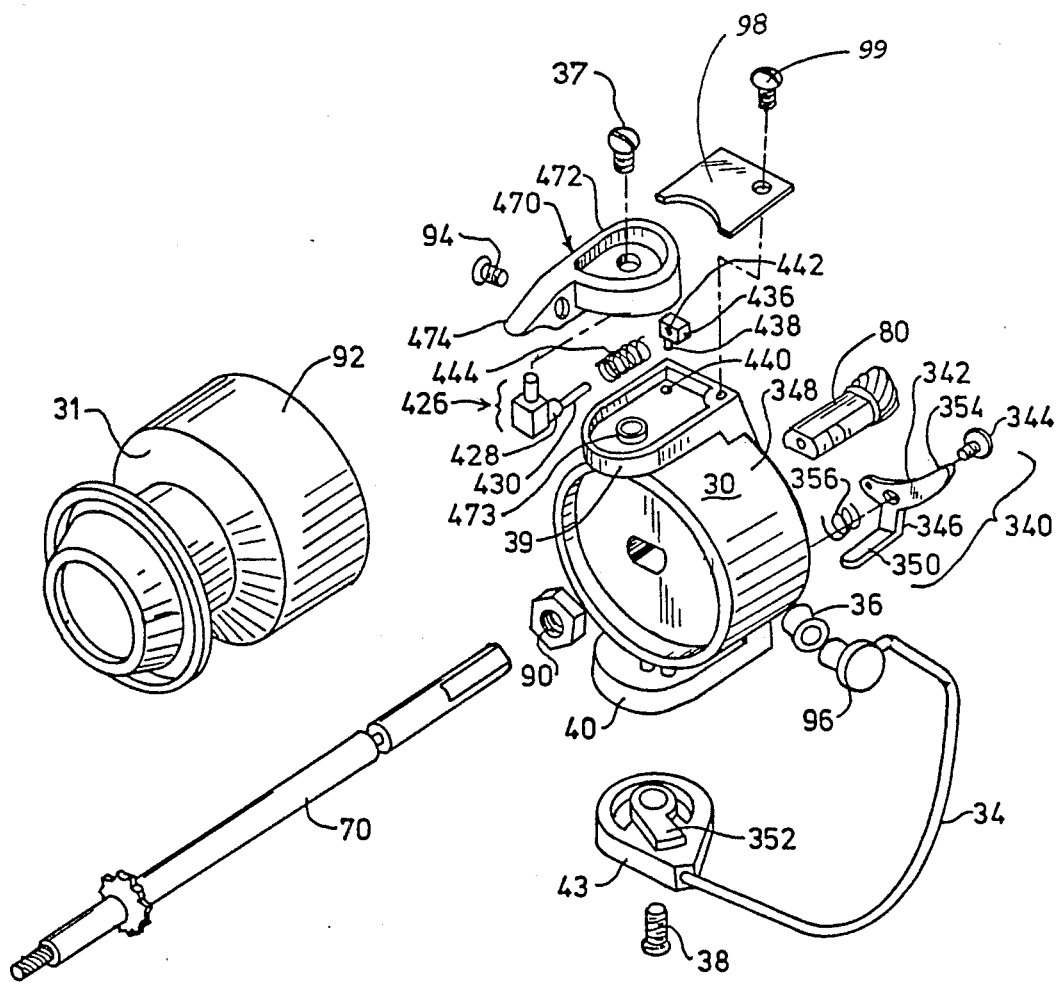
FIG. 9 is a partial exploded perspective view of the modified form of invention shown in FIG. 2.

Referring to the second preferred form shown in FIGS. 2, and 9-12, and in particular FIG. 9, a single horn member 470 is provided, which horn member is a combination of the trigger and bail arm of the version of the invention shown in FIGS. 3-8. The horn member 470 serves as a bail arm 472 for mounting the one end of the bail 34 on the rotor and as a finger grip 474 extending outwardly beyond the plane of the bail. As will be noted in FIG. 10 the finger grip 474, when the bail is closed, is offset from the pivot axis of the bail arm 472. The housing 21, gear assembly 50, oscillating mechanism, rear drag 46 and self-centering mechanism 51 described with respect to FIG. 3 is incorporated herein. The center shaft 70 is slidable and oscillatable in the pinion gear assembly 83 with the rotor 30 secured to the pinion gear assembly by nut 90. The spool 31 is removably attached to the center shaft 70 with the skirt 92 encircling a forward part of cylindrical wall 348 of the rotor 30. The internal bail trip mechanism 340 can be the same as was described hereinabove with respect to FIG. 3. The bail 34 may also be manually closed by applying a forward pressure urging bail arm 472 to rotate past the overcenter position using the same forefinger used to open the bail 34.

The bail arm 472 is pivotally mounted on the bail ear 39 by screw 37 passing through the bail arm and into the boss 473. The line guide 36 is rotatably mounted on the bail arm 472 by a screw 94 passing through the bail arm 472 and into the bail axle 96. The other bail arm 43 is pivoted to the bail ear 40 by screw 38 such that the bail 34 has a pivot axis about the axis of the screws 37,38 between an open casting position and a closed retrieving position.

The overcenter apparatus 426 of FIGS. 3-8 is employed in this second preferred form and includes the front pivot post 428 having the guide rod 430 thereon slidably passing through opening 442 in the back pivot post 436. The pivot 432 on post 428 pivots in an opening 435 in the bail arm 472 and the pivot 438 on post 436 pivots in opening 440 in the bail ear 39. Compression spring 444 encircles guide 430 between posts 428 and 436 to hold the bail 34 in the closed retrieve position. Opening 435 is offcenter (FIG. 10) of the pivot axis of the bail arm 472 to provide the leverage for holding the bail closed. A shaped cover plate 98 is secured over the open portion of the bail ear 39 by screw 99 to retain pivot post 436 in position in the bail ear and to prevent accumulation of dirt and the like in the bail ear.

With the bail 34 in the closed retrieve position and with the self-centering anti-reverse mechanism 51 operative, the crank 28 is rotated in reverse which will engage the self-centering pawl 53 with the tooth 61 on the ratchet 63. In the self-centered position, the rotor 30 will be positioned with the bail ears 39,40 and bail arms 472,43 aligned along an axis substantially parallel with the axis of the stem 24 which will position the finger grip 474 of the horn member 470 below and in vertical alignment with the foot 25 and rod (not shown). A fisherman using the hand that is holding the rod can extend the index finger to a position below and slightly encircling the finger grip 474 which in the process may also pick-up the line extending out from the line guide 36. Now whenever the fisherman wants to cast the line he applies an upward pull on the finger grip 474. The grip 474 is offset from the axis of the bail arm 472 and has a curved underside surface 475 configured so that it tends to slide up the finger of the operator as the operator's finger applies the upward force on the grip surface 475, thereby tending to pivot the bail arm 472 about the axis of screw 37. When the axis of the guide pin 430 and spring 444 passes from the position of FIG. 10 (bail closed) past the common line extending from the rear post 436 through the axis of the pin 37, the compressive forces in the spring 444 will take over and snap the bail arms 472,43 with bail 34 to the open casting position (FIG. 12). The finger of the fisherman will be slipped off the finger grip 474 but, if desired, will still have the line retained thereover ready for casting the line.

When it is desired to retrieve the line, the crank is turned forward which will start to rotate the rotor causing the cam surface 354 on bail trip 340 to engage lug 74 to trip the bail 34 and return the bail to the closed retrieve position.

We claim:

1. In a spinning reel having a housing with a front and rear and having a stem and mounting shoe, a center shaft mounted in the housing, a spool mounted on the shaft for holding a fishing line, a handle and gear train assembly mounted in the housing, a rotor coaxially mounted on the shaft and rotatable by cooperative movement of the handle and assembly, first and second bail ears carried by the rotor, first and second bail arms carried by the first and second bail ears respectively, and a movable bail mounted on the bail arms and having a closed retrieving position and an open casting position, the improvement comprising a bail actuating mechanism for moving the bail from the retrieving position to the casting position comprising:
   (a) first and second pivot means for pivotally supporting the respective first and second bail arms on the bail ears;
   (b) first post means pivotally mounted on the first bail ear in spaced apart relation to the first pivot means;
   (c) second post means pivotally mounted on the first bail arm at a point offset laterally from the first pivot means;
   (d) a guide means carried by one post means and being slidably received in the other post means;
   (e) biasing means on the guide means for urging the first post means away from the second post means and for holding the bail either in the retrieving position or in the casting position; and
   (f) trigger means operatively associated with the first bail arm for pivoting the bail arm from the retrieving position toward the casting position whereby movement of the trigger means moves the guide means and biasing means from one side of a line passing through the first post means and the first pivot means to the other side of that line whereupon the biasing means drives the bail arms and bail into the casing position,
   said trigger means including an elongate arm supported in cantilever fashion from said first bail arm so that the length of the trigger arm is aligned generally in a fore and aft direction with the bail in the retrieving position,
   said arm on the trigger means extending forwardly beyond the bail and second bail arm with the bail in a retrieving position so that the trigger means arm is readily accessible to be grasped by a user and wherein pivoting the trigger means and first bail arm beyond the line joining the pivot means for the first bail arm and the first post means will permit the biasing means to drive the bail into the open casting position,
   said trigger means arm further having a concave surface opening towards the centershaft axis to be engaged by the finger of a user in operating the trigger means.

2. In a spinning reel as claimed in claim 1 wherein said trigger means arm is integral with said first bail arm and substantially rigid.

3. In a spinning reel as claimed in claim 1 wherein there is a generally cylindrical line guide having a central axis and the trigger means arm surface rsides between the line guide axis and the rotational axis of the rotor.

4. In a spinning reel having a housing with a front and rear and means for mounting the housing to a fishing rod, a center shaft mounted in the housing, a spool mounted on the shaft for holding a fishing line, a handle and gear train assembly mounted in the housing, a rotor coaxially mounted on the shaft and rotatable by cooperative movement of the handle and assembly, first and second bail ears carried by the rotor, first and second bail arms carried by the first and second bail ears respectively, a movable bail mounted on the bail arms and movable with the bail arms between a closed retrieving position and an open casting position, and means for biasing the bail arms and bail into each of the retrieving and casting positions, the improvement comprising a trigger for moving the bail from the retrieving position to the casting position, said trigger comprising:
   an elongate arm supported in cantilever fashion from said first bail arm so that length of the trigger arm is aligned generally in a fore and aft direction with the bail in the retrieving position,
   said arm on the trigger extending forwardly beyond the bail with the bail in a retrieving position so that the arm is readily graspable by a user,
   said trigger arm further having a curved surface facing the centershaft axis to be engaged by the finger of a user in operating the trigger to urge the trigger so that the bail arms and bail move from said retrieving position toward said casting position sufficiently that the biasing means moves the bail arms and bail into the casting position.

5. A spinning reel as claimed in claim 4 wherein said trigger and the first bail arm comprise a single piece.

6. A spinning reel as claimed in claim 4 wherein said trigger surface is concave opening towards said spool.

7. A spinning reel as claimed in claim 4 wherein there is a generally cylindrical line guide having a central axis and the trigger arm surface resides between the line guide axis and the rotational axis of the rotor.

* * * * *